United States Patent
Shoher

(10) Patent No.: US 7,562,096 B2
(45) Date of Patent: Jul. 14, 2009

(54) METHOD FOR REMOTELY ACCESSING A COMPUTER

(76) Inventor: Itzhak Shoher, 50 Shlomo Hamelech Street, Tel Aviv (IL) 64386

( * ) Notice: Subject to any disclaimer, the term of this patent is extended or adjusted under 35 U.S.C. 154(b) by 0 days.

(21) Appl. No.: 09/729,362

(22) Filed: Dec. 5, 2000

(65) Prior Publication Data

US 2002/0165863 A1    Nov. 7, 2002

(51) Int. Cl.
*G06F 17/00*    (2006.01)
(52) U.S. Cl. ............ 707/104.1; 707/101; 707/102
(58) Field of Classification Search .......... 345/157, 345/168; 707/3, 104.1, 102, 101
See application file for complete search history.

(56) References Cited

U.S. PATENT DOCUMENTS 5,903,259 A * 5/1999 Brusky et al. ............ 345/168
6,097,374 A * 8/2000 Howard .................. 345/168
6,292,172 B1 * 9/2001 Makhlouf ................ 345/157
6,675,019 B1 * 1/2004 Thomson et al. ......... 455/521

* cited by examiner

*Primary Examiner*—Sana Al-Hashemi
(74) *Attorney, Agent, or Firm*—Eugene Lieberstein

(57) ABSTRACT

The present invention is a portable device and system for remotely accessing a computer from a distant location and includes a keyboard processing unit having a keyboard processor with an ASCII encoder and decoder for receiving and transmitting ASCII data, a keyboard, an input output terminal and a modem for connecting the keyboard processor to a wireless telephone communicating device such as a cell phone to permit a wireless telephone interconnection to be made between the terminal keyboard processing unit and a modem in the remotely located computer and preferably, but optionally, includes an RF modulator and an RF transmitter for permitting wireless transmission to a TV video monitor for displaying and/or editing data files stored in the remotely located computer or for creating new files or is connected to another video monitor.

4 Claims, 2 Drawing Sheets

METHOD FOR REMOTELY ACCESSING A COMPUTER

FIELD OF THE INVENTION

This invention relates to a method for remotely accessing a computer using a TV or other video monitor at the remote location to display the stored computer data files for the purpose of reading and/or editing or creating new data files. The method of the present invention may also be used to access a computer remotely through the Internet so as to view and/or transfer information from the world wide web "WWW" for display in the TV or other video monitor.

BACKGROUND OF THE INVENTION

A desktop computer is generally used to create and store personal and business information files and records. Remote access to the data files in the desktop computer when traveling either on business or for pleasure can only be accomplished, at present, by a modem connection through another computer assuming another computer is available. The other computer may be another desk top computer or a portable notebook type computer. It would however be desirable when away on a business trip or on vacation to be able to remotely access the desk top computer in one's office or home using a TV or other video monitor to display the stored computer data files for the purpose of reading and/or editing or creating new data files and for storing the edited or newly created files in the remotely accessed computer. It would also be desirable to access the Internet through the remotely accessed computer so as to view and/or transfer information from the world wide web "WWW" for display in the TV or other video monitor.

The portable device and system of the present invention provides wireless access to a remotely located desktop computer and permits data files stored in the remotely accessed computer to be displayed over any available video monitor preferably a standard TV without any physical connection to the video monitor. Alternatively, information on the world wide web "WWW" may be displayed on the video monitor by accessing the Internet through the remotely accessed computer. The files of the remotely located desktop computer may also be edited or new files created etc. using the TV monitor to display the edited or newly created files and the edited or newly created files may be stored in the remotely accessed computer. If a printer is available the accessed and/or edited files in the remotely located desktop computer may also be downloaded and printed. In addition, e-mail may be sent via the Internet with or without attachments of selected data files stored in the remotely located desktop computer through operation of the remotely located desktop computer using the TV monitor to display the e-mail message and/or attachments before transmission.

SUMMARY OF THE INVENTION

The portable device and system of the present invention comprises a keyboard processing unit including a keyboard processor having an ASCII encoder and decoder for receiving and transmitting ASCII data, a keyboard, an input output terminal, a modem for connecting the keyboard processor to a telephone communicating device such as a cell phone to permit a telephone interconnection to be made between the terminal keyboard processing unit and a modem in a remotely located computer and with the keyboard processing unit further comprising an RF modulator and an RF transmitter for wireless transmission to a TV video monitor. The system may also include a mouse with the keyboard and mouse used to edit and/or modify data transmitted from the remotely located computer through the keyboard processor to a video monitor such as a TV set or to form a new data file and/or to prepare an e-mail message by access of the Internet through the remotely accessed computer.

DETAILED DESCRIPTION OF THE INVENTION

Figure 1:
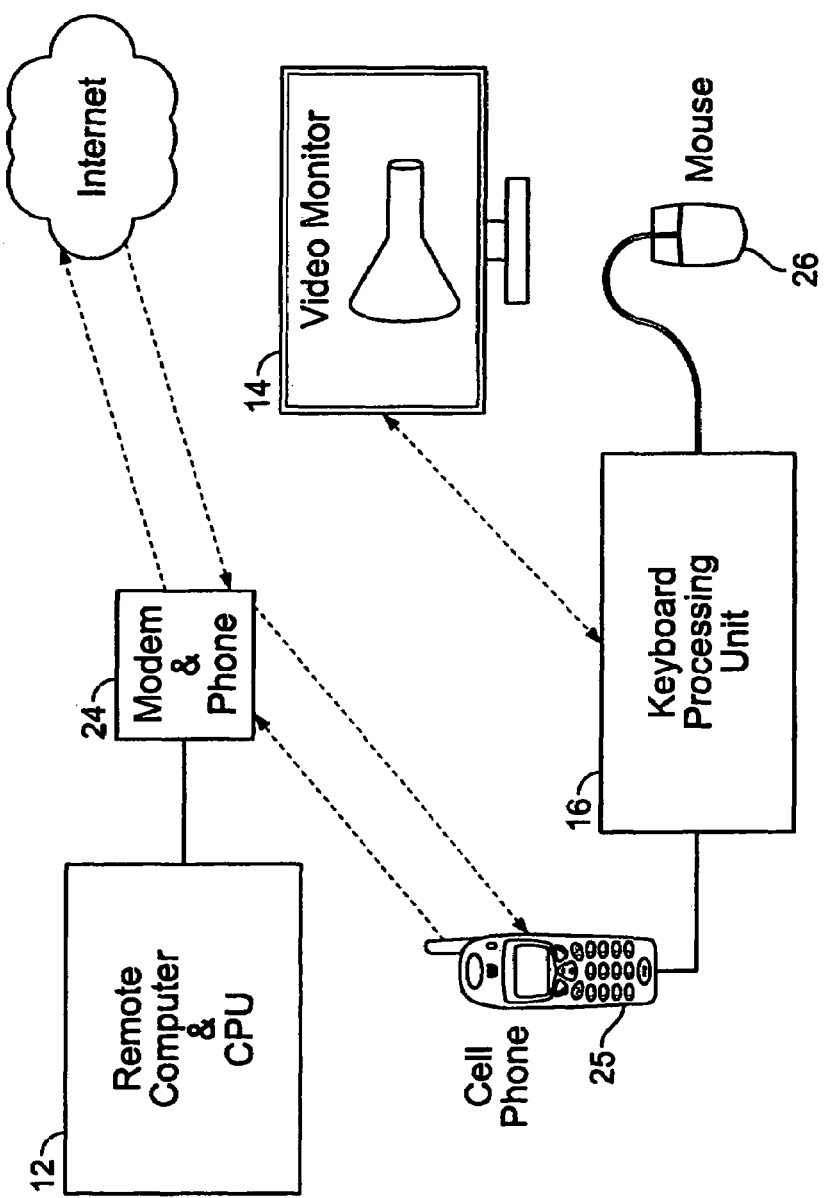
FIG. 1 is a schematic diagram of the portable device and system of the present invention for accessing and operating a remotely located computer and for displaying its data and/or information from the WWW on a video monitor.

The portable device and system of the present invention is diagrammatically illustrated in FIG. 1 and includes a keyboard processing unit 10 to access and operate a remotely located computer 12, e.g. a desk top computer in a home or business office through a telephone land line connection or through a wireless cell phone connection and to access a video monitor 14, preferably a TV monitor for displaying data files stored in the desktop computer 12 on the video monitor 14 for purposes of viewing the data files and/or for editing or creating new data files. The keyboard processing unit 10 may also be used to access the remotely located computer 12 and, in turn, to access the Internet through the remotely located computer 12 for displaying information from the Internet on the video monitor 14 or for sending or receiving an e-mail through the Internet accessed through the remotely located computer 12.

Figure 2:
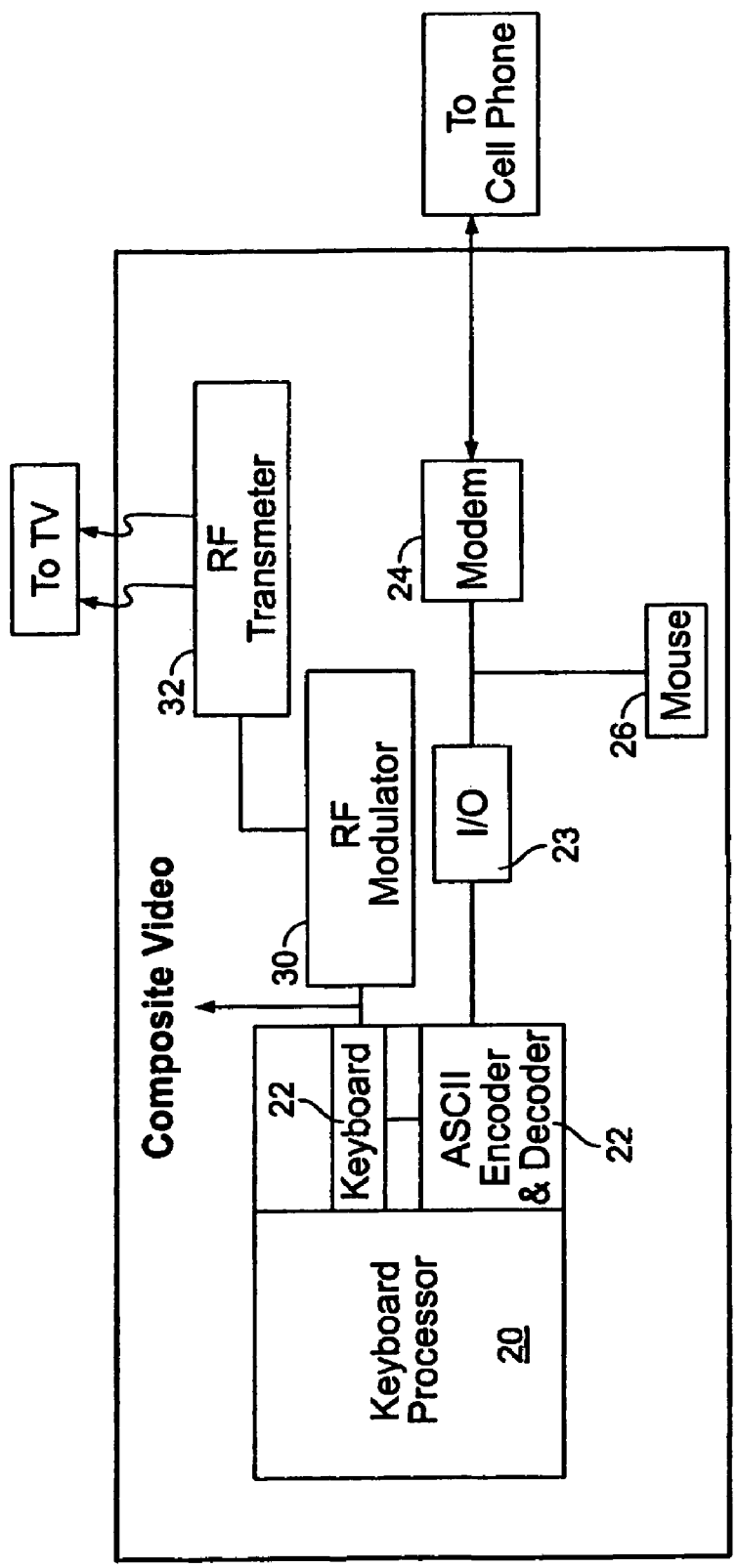
FIG. 2 is a more detailed block diagram of the Keyboard Processing Unit in the portable device and system of FIG. 1.

A block diagram of the keyboard processing unit 10 is shown in FIG. 2 consisting of a keyboard processor 20 with an ASCII encoder and decoder 22 for receiving ASCII data and converting it to a composite video signal or for transmitting ASCII data, a keyboard 22, an input output terminal 23 and a modem 24 for connecting the keyboard processor 20, ASCII encoder and decoder 22 and the keyboard 22 to a telephone communicating device 25. The telephone communicating device 25 may be a cell phone so as to permit a wireless telephone interconnection to be made between the keyboard processing unit 10 and a modem 24 in a remotely located computer 12. A keyboard terminal processor having a keyboard, ASCII encoder and decoder and an input/output terminal is conventional. In the past a keyboard processor having an ASCII encoder and decoder and an input/output terminal was made available commercially with a display monitor but without a CPU (Central Processing Unit) and was referred to as a "dumb terminal". The keyboard processing unit 10 of the present invention other than the keyboard may be miniaturized and incorporated into an otherwise conventional mouse type unit for portable transportation. Miniature keyboards 22 are also available. The modem 24 permits an operator to make a telephone connection between the modem in the remotely located desk top computer 12 and the terminal processing unit 10. This may be done through a wireless cell phone.

To access data in the data files stored in the remotely located desk top computer 12 it is essential to have a video monitor 14 available to display such data. The monitor 14 may represent any conventional video display but is preferably a standard TV monitor. The RF modulator 30 and RF transmitter 32 in the keyboard processing unit 10 permits wireless communication between the keyboard processor 20 and a standard TV video monitor 14 provided the standard TV monitor 14 has its power on and is turned to channel 3 or possibly channel 4. Channel 3 on a TV monitor has been designated by standardization for peripheral reception and is accepted worldwide. Accordingly, alphanumeric information can be transferred by wireless communication from the keyboard processing unit 10 to a standard TV video monitor 14 provided the alphanumeric information is radio frequency modulated for reception. The RF modulator 30 is of conventional design as is the RF transmitter 32 and are needed to establish wireless contact with the TV video monitor 14. Since the keyboard processing unit 10 is also in communication with the remotely located desk top computer 12 alphanumeric information from data files stored in the remotely located desk top computer 12 can be readily displayed on the display screen of the TV monitor 14 using the mouse 26 as if it were the mouse 26 was directly connected to the desk top computer 12. In this way the desk top computer 12 is remotely controlled and its data files accessed for viewing or for modification on the TV monitor 14. The mouse 26 and/or keyboard 22 are used to edit data files displayed on the video monitor 14 or to create new data file which are then stored in the remotely accessed computer 12.

When displaying information accessed through the Internet from the remotely accessed computer 12 on the video monitor 14 the keyboard 22 is not used. However, for e-mail messages the keyboard 22 would be used in the conventional manner. Access to the Internet from the remotely located desk top computer 12 assumes the desk top computer 12 has an internal WWW browser and will support a WWW browser application. Once the Internet is accessed an e-mail message may be transmitted or received through the internet connection from the remotely located desk top computer 12 through the wireless coupling to the standard TV monitor display 14 for creating the e-mail message with or without the attachment of data files and transferring it to a third party and/or receiving an e-mail from a third party in real time or simply to receive and view information on the internet.

It should be understood that the video monitor 14 may also be a terminal incorporated into the keyboard processing unit 10 and may have a display screen of any desired size. In this case the keyboard processing unit 10 communicates only with the remotely located computer 12 to access its files and/or with the Internet. Alternatively, the keyboard processing unit 10 may be connected to the video monitor of another computer terminal so as to permit access to the remotely located computer 12 to access its files and to display the data on the monitor of the computer terminal. Wireless access to another computer terminal is also possible.

What is claimed is:

1. A method for accessing a computer having a CPU with information processing capability and memory for forming and storing data files of business and/or personal information located at a first location to view, create, modify and/or transfer information to and from the stored data files in said computer by an operator located at a second location remote from said first location with the second location being absent a computer with a CPU and/or information processing capability to create and/or store data files but having available at said second location means for communicating with the internet including a wireless communicating device, a video monitor, browser and keyboard processor unit and having a keyboard and an ASCII encoder and decoder for receiving and transmitting ASCII data comprising the steps of: using the wireless communicating device to establish a wireless interconnection through the internet via said browser for communicating between the keyboard processing unit at the second location and the remotely located computer at the first location and using the keyboard in conjunction with the video monitor at the second location to access information from the computer at the first location for display on said video monitor at the second location and to use the keyboard in conjunction with the video monitor to modify information stored in existing files in the remotely located computer and/or create new data files in said computer.

2. A method as defined in claim 1 wherein said video monitor is a TV and wherein an RF modulator and an RF transmitter is used to transmit and receive information wirelessly between the keyboard processing unit and the TV video monitor.

3. A method for accessing a computer having a CPU and information processing capability and memory for forming and storing data files of business and/or personal information located at a first location to view, create, modify and/or transfer information to and from such computer by an operator located at a second location remote from said first location using at the second location a video monitor, a modem, means for communicating with the internet including a browser for accessing the internet and a keyboard processor unit having a keyboard and an ASCII encoder and decoder for receiving and transmitting ASCII data but without the availability at the second location of another computer with a CPU having information processing capability and memory to form and store data files and having a wireless cellular telephone communicating device at said second location for connecting said keyboard processing unit to the internet via said modem comprising the steps of: using the cellular telephone to establish a wireless interconnection through the internet for communicating between the keyboard processing unit and the computer and using the keyboard in conjunction with the video monitor at the second location to access information from the computer at the first location for display on said video monitor at the second location and to use the keyboard in conjunction with the video monitor to modify information stored in existing files in the computer a the first location and/or create new data files in the computer in the first location.

4. A method as defined in claim 3 wherein said video monitor is a TV and wherein an RF modulator and an RF transmitter is used to transmit and receive information wirelessly between the keyboard processing unit and the TV video monitor.

* * * * *